United States Patent [19]
Hart et al.

[11] Patent Number: 5,480,218
[45] Date of Patent: Jan. 2, 1996

[54] RAILWAY BRAKE PIPE BRACKET WITH ACCESS PORTS

[75] Inventors: James E. Hart, Trafford; Gary M. Sich, Irwin, both of Pa.

[73] Assignee: Westinghouse Air Brake Company, Wilmerding, Pa.

[21] Appl. No.: 306,790

[22] Filed: Sep. 15, 1994

[51] Int. Cl.⁶ ..................................................... F16L 39/00
[52] U.S. Cl. ........................ 303/28; 137/594; 285/137.1
[58] Field of Search ................................... 303/28, 1, 35, 303/26, 27, 25, 86, 48, 2, 5, 9, 13; 137/594; 285/131, 137.1; 138/109; 251/149.1

[56] References Cited

U.S. PATENT DOCUMENTS

| | | |
|---|---|---|
| 1,309,787 | 7/1919 | Turner . |
| 2,087,623 | 7/1937 | Canetta et al. . |
| 2,464,977 | 3/1949 | Gorman . |
| 2,802,701 | 8/1957 | McClure . |
| 3,022,117 | 2/1962 | Hewitt . |
| 3,160,446 | 12/1964 | McClure et al. . |
| 3,716,276 | 2/1973 | Wilson et al. . |
| 3,944,264 | 3/1976 | Mong et al. . |
| 4,033,632 | 7/1977 | Wilson . |
| 4,171,559 | 10/1979 | Vyse et al. ............... 285/137.1 |
| 4,611,831 | 9/1986 | Truchet .................. 285/137.1 |
| 4,770,472 | 9/1988 | Weber, Jr. et al. . |
| 4,830,438 | 5/1989 | Hart et al. . |
| 5,297,820 | 3/1994 | Martin .................... 385/137.1 |

FOREIGN PATENT DOCUMENTS

| | | | |
|---|---|---|---|
| 0006239 | 1/1980 | European Pat. Off. .......... 137/594 |
| 3011226 | 10/1981 | Germany .................. 285/137.1 |

OTHER PUBLICATIONS

AB Single Capacity Freight Car Air Brake Equipment with ABDX Type Control Valve Catalog by Westinghouse Air Brake Company, 1991.
"Code of Air Brake System Tests for Freight Equipment" Association of American Railroads, Nov., 1992.

*Primary Examiner*—Matthew C. Graham
*Attorney, Agent, or Firm*—George P. Baier

[57] ABSTRACT

A pipe bracket for use in a freight brake control valve on a railway freight vehicle. A service portion and an emergency portion are mounted to a first pipe bracket side directed opposite to the first pipe bracket side. Piping to a brake pipe, a brake cylinder, an emergency reservoir and an auxiliary reservoir are connected to a second side of the pipe bracket. A plurality of passageways are provided through the pipe bracket portion for providing fluid communication from the brake pipe, the brake cylinder, the emergency reservoir, and the auxiliary reservoir to the service portion and the emergency portion. One or more and preferably four access ports connect to one or more and preferably each of the passageways. Preferably, the access ports are provided on the first side of the pipe bracket portion. A housing having one or more channels, each corresponding to an access port is engaged to the pipe bracket portion so that fluid pressure at the access ports can be transmitted to the housing. The housing has a valve means for containing a pressure within the channels. A removable outer cover may be provided over the housing for sealing the channels. Or, an adaptor may engage the housing, opening the valve means, for accessing the fluid pressures.

16 Claims, 10 Drawing Sheets

RAILWAY BRAKE PIPE BRACKET WITH ACCESS PORTS

BACKGROUND OF THE INVENTION

1. Field of the Invention

This invention relates generally to brake control valve devices for railway cars and more particularly to means adapted to the pipe bracket portion of said brake control valve devices for directly accessing fluid lines and determining the pressures thereof.

2. Description of the Prior Art

Typical freight control valves such as the ABD, ABDW, DB-60 and ABDX control valves, are comprised of a pipe bracket portion having a service portion and an emergency portion mounted on opposite sides or faces of the pipe bracket. Such a typical control valve assembly is shown in prior art diagrammatic FIG. 1. Typically, a third side, the rear, of the pipe bracket portion has a number of connections for connecting the pipe bracket portion to piping of the freight car. These connections typically include connections to the brake pipe, the brake cylinder retaining valve, the brake cylinder, the emergency reservoir and the auxiliary reservoir. The pipe bracket connection to these pneumatic pipes permits the pipe bracket to provide the necessary communication of pressures to both the service and emergency valve portions. The pipe bracket portion, because it has a service portion and an emergency portion mounted on opposed sides, may physically limit access to portions of the car including the various connections. With the pipe bracket portion thus limiting access to the connections, tapping into or otherwise measuring the pressure in the fluid lines is difficult. Thus, one attempting to access the area behind the pipe bracket would have to additionally go around the service portion or the emergency portion. In addition, the removal of a service or emergency portion bolted to the lateral opposing sides of the pipe bracket for testing or repair may be difficult because of interference from the car body or car mounted equipment.

SUMMARY OF THE INVENTION

It is, therefore, an object of the present invention to incorporate a single-sided pipe bracket portion (i.e. a pipe bracket portion in which the service portion and emergency portion are mounted on the same side or face of the pipe bracket) into a railway freight brake control valve. The use of the single-sided pipe bracket portion of this invention makes access to the pressure in the auxiliary reservoir, the retainer, the emergency reservoir and brake cylinder lines easier so as to more readily determine the pressure of fluids in those lines. Also, since both service and emergency portions of the valve are mounted on the front, they may more easily be removed and replaced.

It is another object of the invention to provide a means to directly access the various passageways of the pipe bracket portion without disconnecting any air lines connected to the pipe bracket, without removing either the service portion or the emergency portion, and without having to access the area behind the pipe bracket portion.

These objectives are accomplished by providing an improved, single-sided pipe bracket portion for use in a freight brake control valve of a railway freight vehicle having access ports thereupon. Such railway freight brake control valve is of the type having provisions for connecting to a brake pipe, a brake cylinder retaining valve, a brake cylinder, an emergency reservoir and an auxiliary reservoir connected to the pipe bracket portion. The control valve further has a service portion and an emergency portion mounted to the pipe bracket portion.

The pipe bracket portion has a first side and an oppositely directed second side. The first side of the pipe bracket portion is provided with means for mounting the service portion and the emergency portion to the pipe bracket portion first side. The second side of the pipe bracket has means for connecting to pipes which communicate with the brake pipe, the brake cylinder retaining valve, the brake cylinder, the emergency reservoir and the auxiliary reservoir. A plurality of passageways are provided through the pipe bracket portion for providing fluid communication from the brake pipe, the brake cylinder, the emergency reservoir, and the auxiliary reservoir to the service portion and to the emergency portion.

One or more access ports are provided that are connected to respective ones of the passageways communicating to the brake pipe, the brake cylinder retaining valve, the brake cylinder, the emergency reservoir and the auxiliary reservoir. Preferably, the access ports are provided on the first side of the pipe bracket portion.

In some embodiments, an access housing is fixed to the access ports. Such housing may have a valve means to contain the fluid pressure within the passageways when the valve means is "closed".

When the fluid pressure within any or all of the passageways is to be tested, an adaptor is preferably engaged with the access housing, "opening" the valve means and allowing the fluid under pressure to enter the adaptor. Connections provided on the adaptor may then lead to a pressure testing device so that the fluid pressure within the passageways may be analyzed. When the adaptor is removed from the access housing, the valve means acts as a primary seal, sealing the access housing and preventing fluid pressure from being lost. The adaptor may be provided with a cam system or other means for moving the extending members into and out of the access housing so as to move the valve means into and out of the "open" position.

It is preferred that once the adaptor is removed from the housing and the fluid pressures within the passageways is not being tested, a removable outer cover is provided over the access housing to assist in sealing the access housing, and for preventing the entry of dirt or foreign material into the passageways.

When the fluid pressures within the passageways are not being tested, the housing may be removed from the pipe bracket portion. Once the housing is removed, a primary seal cover may be attached directly to the pipe bracket portion at the access ports, preventing fluid pressure from exiting the access ports.

It is further preferred that at least four access ports are utilized, communicating with each of the brake pipe, the brake cylinder, the emergency reservoir and the auxiliary reservoir. A quick action chamber is additionally provided in the pipe bracket portion. And, it is preferred that a quick action chamber access port is also provided for communicating to the quick action chamber.

Because the service portion and emergency portion are each mounted on the same side or face of the pipe bracket portion and because the side upon which the service portion and emergency portion are mounted, is the side of the pipe bracket portion opposed to the car, removal of a service portion or emergency portion is easily performed as there is no interference from the car body or from any car mounted equipment. Furthermore, one attempting to access the area behind the pipe bracket portion would have access from either lateral opposing side of the pipe bracket portion. Additionally, the inclusion of the access ports on the front face of the pipe bracket portion allows for fluid pressures within the pipe bracket portion to be tested without removal of the service or emergency portion from the pipe bracket portion.

Other objects and advantages of the invention will become apparent from a description of certain present preferred embodiments thereof shown in the drawings.

DETAILED DESCRIPTION OF THE PREFERRED EMBODIMENT

Figure 1:
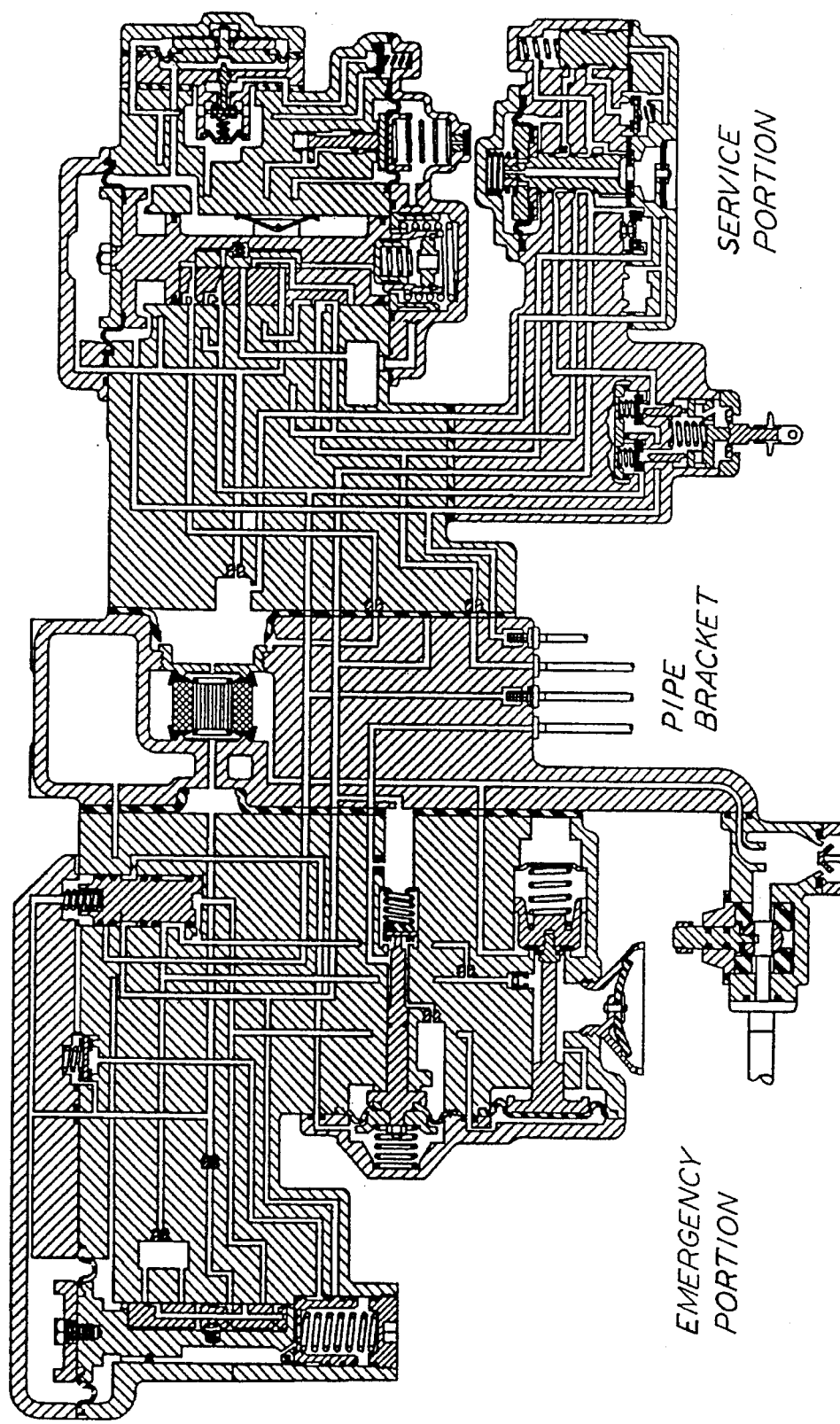
FIG. 1 is a prior art schematic of a railway freight brake control valve showing the pipe bracket portion, the emergency portion and the service portion and the passageways running therethrough.

As can be seen in schematic prior art FIG. 1, air brake practice has heretofore incorporated pipe brackets in freight brake control valves which have the emergency portion and service portion thereof mounted on opposite sides of the pipe bracket portion. The drawbacks associated with this design are described above. As can further be seen in FIG. 1, various fluid passageways contact the pipe bracket portion with the emergency portion and service portion, respectively.

Figure 2:
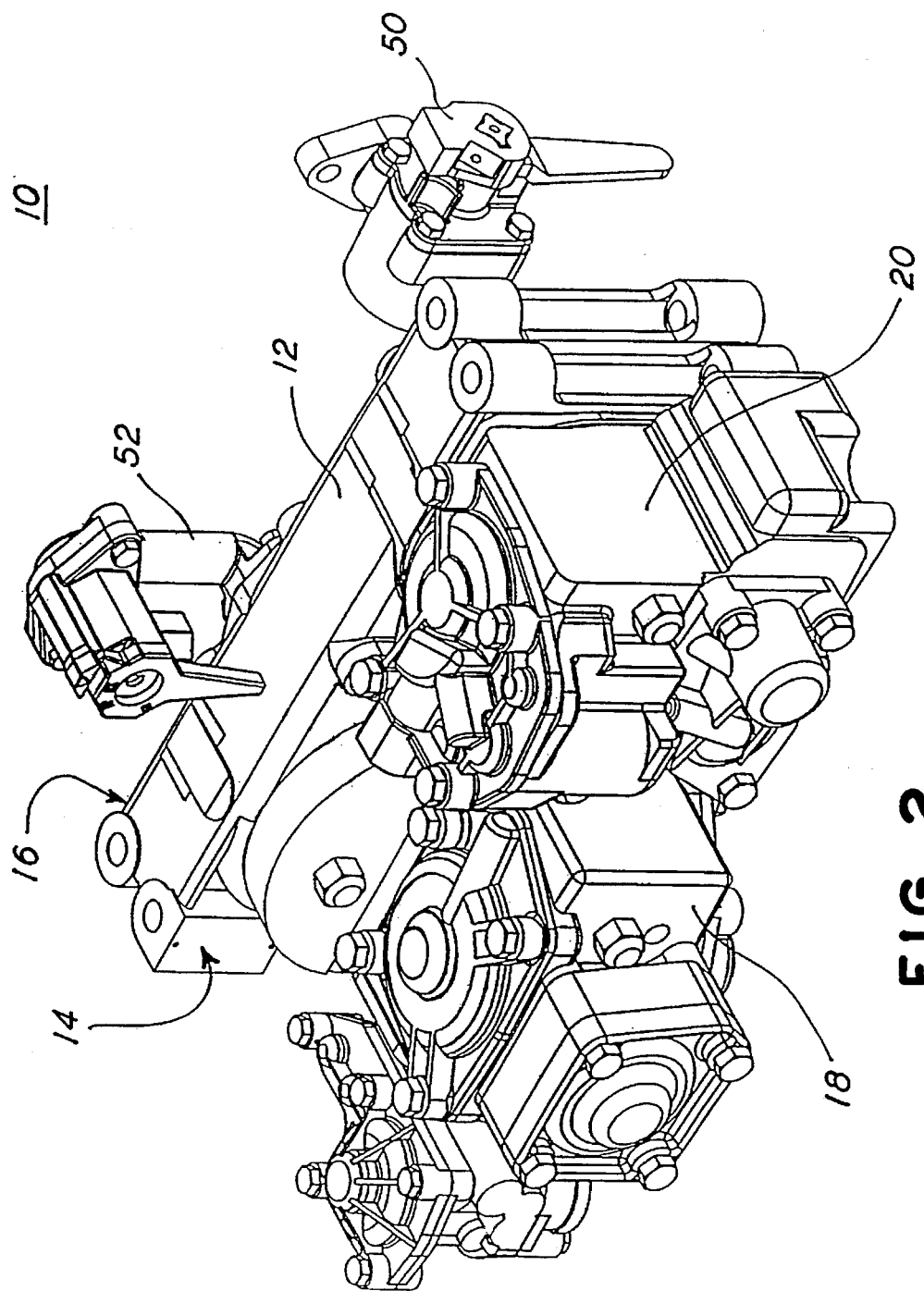
FIG. 2 is a perspective view of the preferred control valve showing the preferred pipe bracket portion, the emergency portion and the service portion.

FIG. 2 shows a preferred railway freight control valve 10 incorporating the preferred single-sided pipe bracket portion 12. The preferred single-sided pipe bracket portion 12 has a first side 14 and a second side 16 directed oppositely to one another. The pipe bracket portion first side 14 has an emergency portion 18 and service portion 20 mounted thereto. Both the emergency and service portions 18, 20 as shown are mounted by any suitable means such as by using threaded bolts or studs. The emergency portion 18 and service portion 20 are mounted upon opposite ends of first side 14. The emergency portion 18 and service portion 20 are spaced apart a selected amount such that an area or space is provided between the emergency portion 18 and the service portion 20 on the first side 14 of pipe bracket portion 12.

A brake pipe connection (not shown) connects a brake pipe to the pipe bracket portion 12 and is provided at the second side 16 of the pipe bracket portion 12. A brake cylinder line, a brake cylinder retaining valve line, an emergency reservoir line and an auxiliary reservoir line (each not shown) are also connected to the second side 16 of the pipe bracket portion 12, by any suitable means, such as by flanged fittings. A retainer 52 and a dirt collector 50 are shown connected to the pipe bracket portion second side 16.

Figure 3:
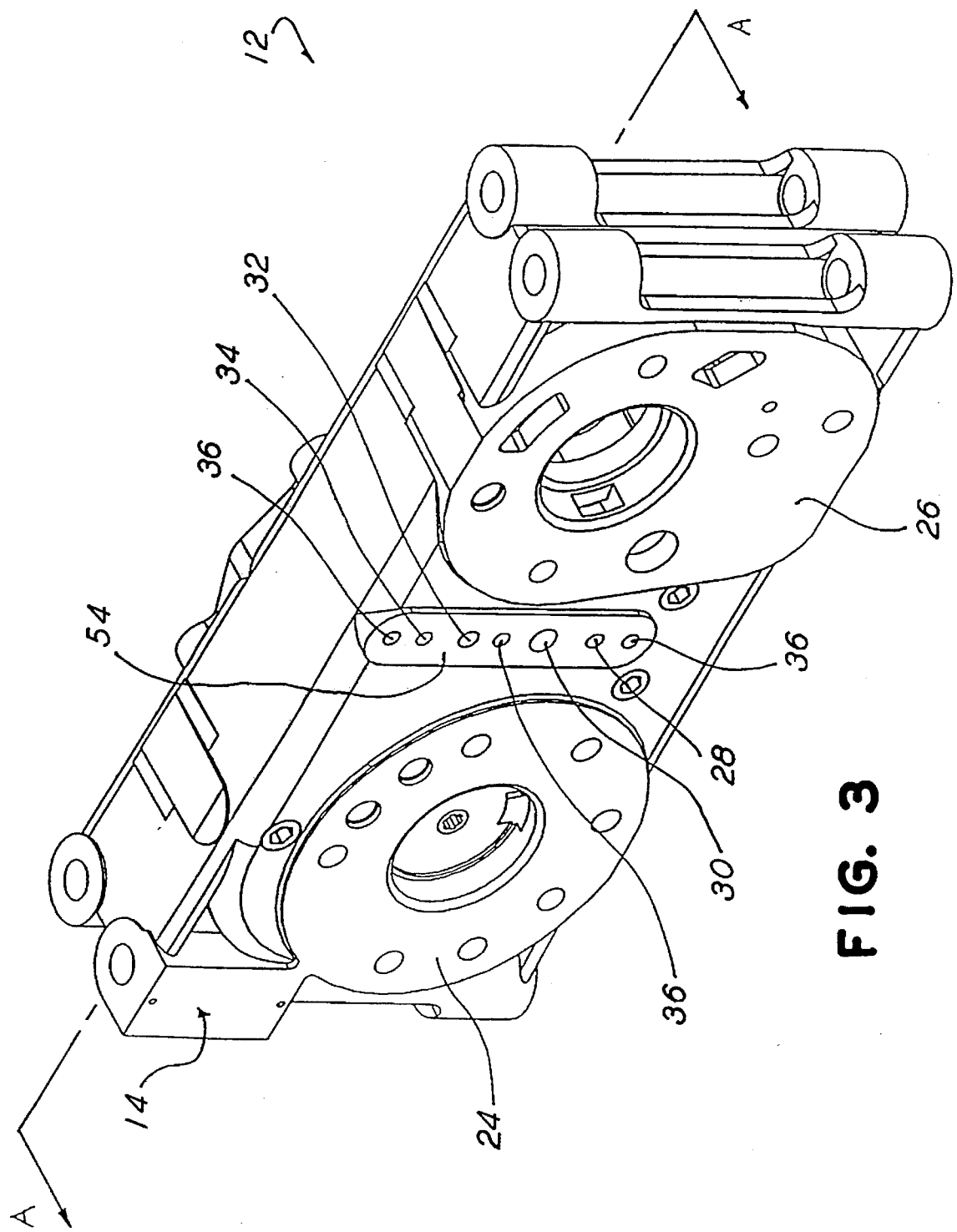
FIG. 3 is a perspective view of the first side of the preferred pipe bracket portion with the emergency portion and the service portion detached therefrom.

Referring next to FIG. 3, the preferred pipe bracket portion 12 is shown having the emergency portion 18 and the service portion 20 detached therefrom. The emergency portion 18 is mountable to a mounting surface 24 on the pipe bracket portion first side 14 and the service portion 20 is mountable to a mounting surface 26 on the pipe bracket portion first side 14. Thus, between the mounting surface 24 and the mounting surface 26 lies an area on pipe bracket portion first side 14. Provided upon this area between mounting surface 24 and mounting surface 26 are four access ports 28, 30, 32, 34. Access port 28 connects to the brake cylinder passageway, access port 30 to the brake pipe passageway, access port 32 to the auxiliary reservoir passageway and access port 34 to the emergency reservoir passageway (the passageways are not shown in FIG. 3). Each passageway communicates to a respective line which is connected to the pipe bracket portion 12. The access ports 28, 30, 32, 34 are located upon a mounting surface or boss 54 of the pipe bracket portion 12. The boss 54 is preferably integral with the pipe bracket portion 12 and its surface is preferably planar. Threaded screw holes 36 are also preferably provided on boss 54.

Figure 4:
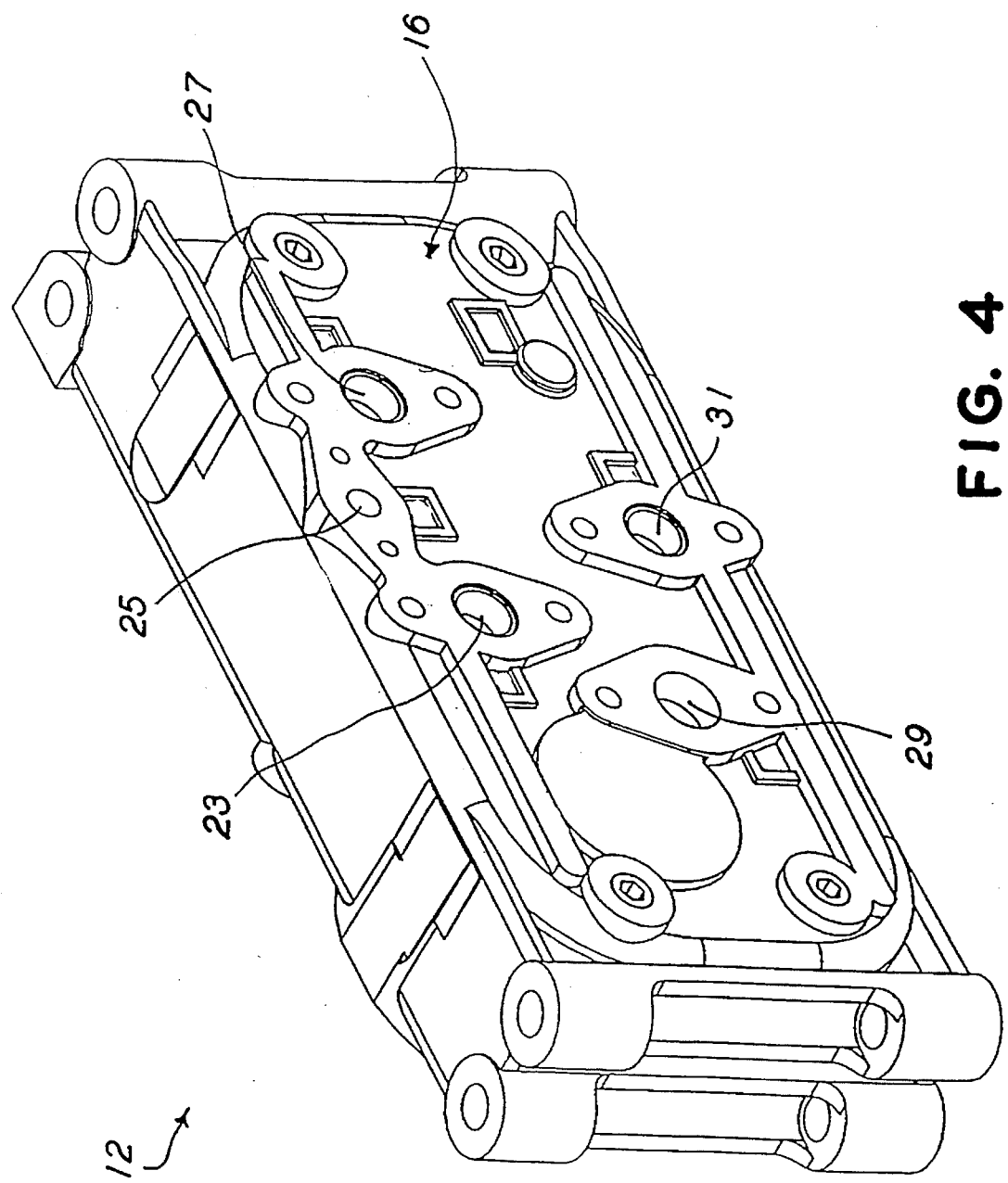
FIG. 4 is a perspective view of the second side of the preferred pipe bracket portion with the connections detached therefrom.

The second side 16 of the preferred pipe bracket portion 12 is shown in FIG. 4. In FIG. 4, the connections to the auxiliary reservoir, the retainer, the emergency reservoir, the brake pipe and the brake cylinder (not shown) are detached from the pipe bracket portion 12. The auxiliary connection is connected to the pipe bracket portion at location 23, the retainer is connected at location 25, the emergency reservoir at location 27, the brake pipe connection at location 29, and the brake cylinder connection at location 31.

Figure 5:
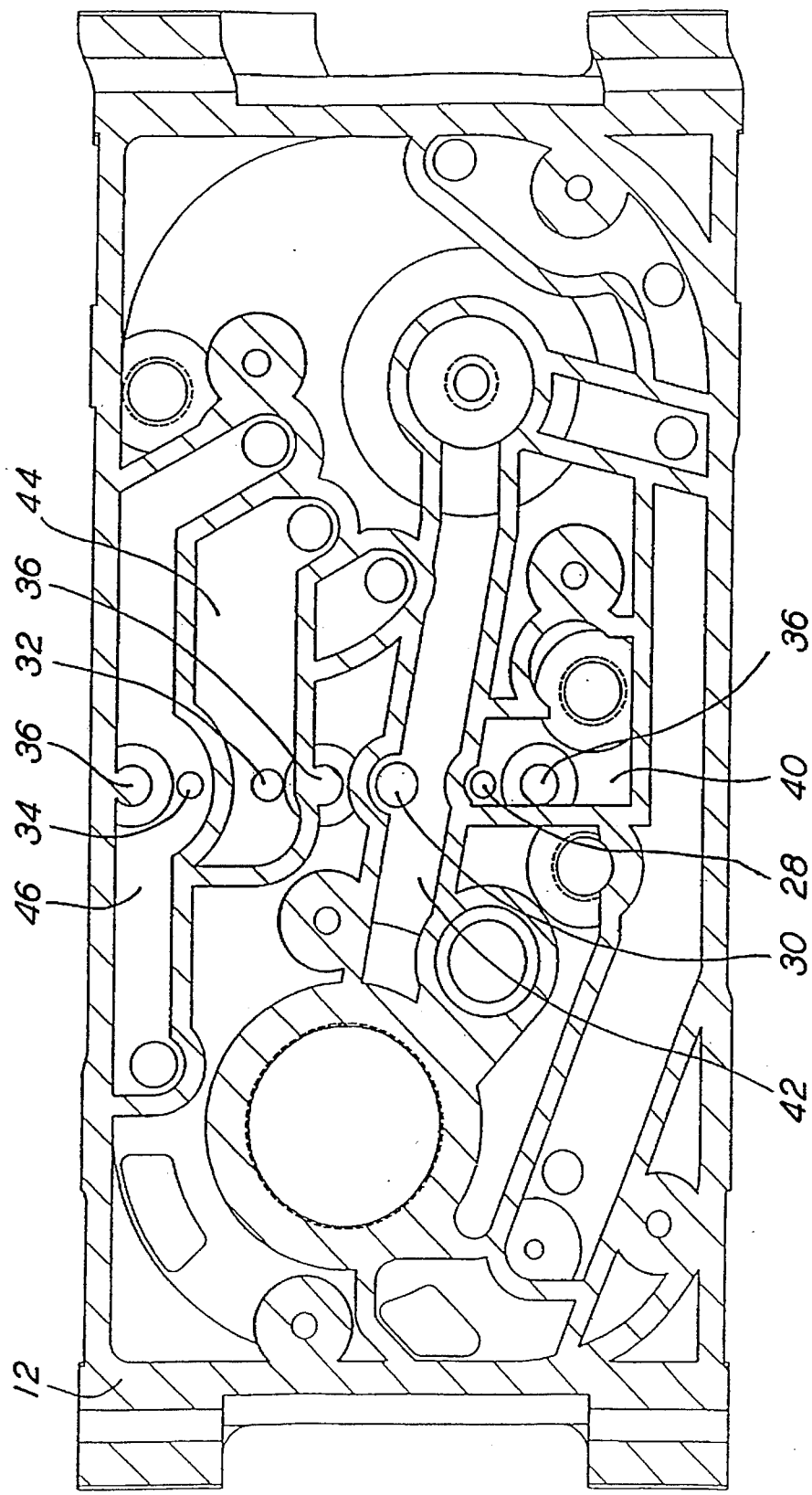
FIG. 5 is a cross sectional view of the pipe bracket portion taken along line A—A of FIG. 3.

FIG. 5 shows a cross sectional view of the pipe bracket portion 12 taken along line A—A of FIG. 3 in which the various passageways can be seen. The brake cylinder access port 28 is shown connected to the brake cylinder passageway 40, which is in turn connected to a brake cylinder line (not shown) leading to a brake cylinder. The brake pipe access port 30 is shown connected to the brake pipe passageway 42, which is in turn connected to a brake pipe line (not shown) leading to the brake pipe. The auxiliary reservoir access port 32 is shown connected to auxiliary reservoir passageway 44, which is in turn connected to an auxiliary reservoir line (not shown) leading to the auxiliary reservoir. The emergency reservoir access port 34 is shown connected to the emergency reservoir passageway 46, which is in turn connected to an emergency reservoir line (not shown) leading to the emergency reservoir. In this way, the access ports 28, 30, 32, 34 communicate directly to the respective passageways and to the respective air lines. Therefore, the fluid pressure in each air line may be monitored by accessing the air through the access ports 28, 30, 32, 34.

Figure 6:
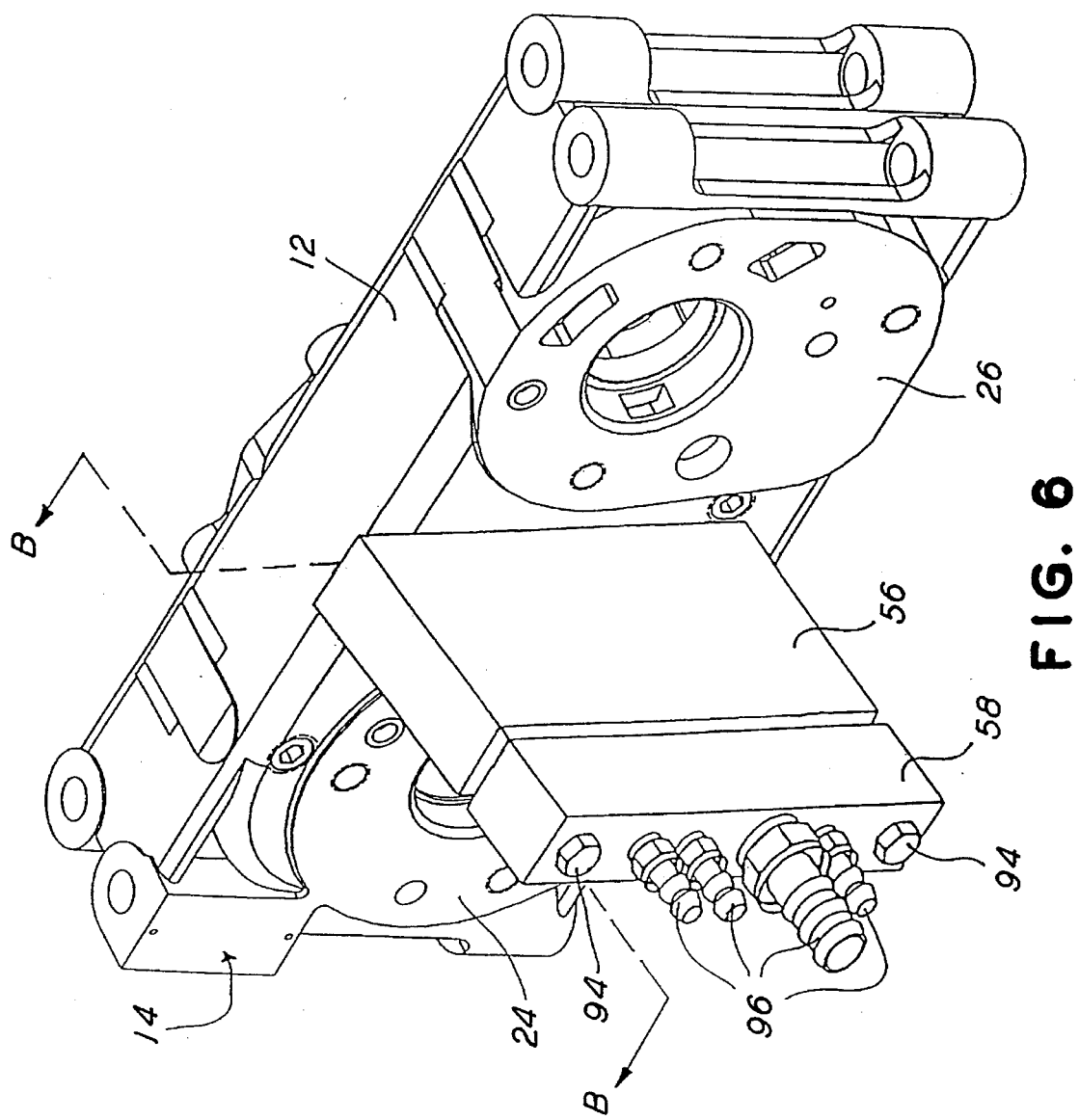
FIG. 6 is a view of the pipe bracket portion similar to FIG. 3 with the housing and adaptor attached to the first side thereof.
Figure 7:
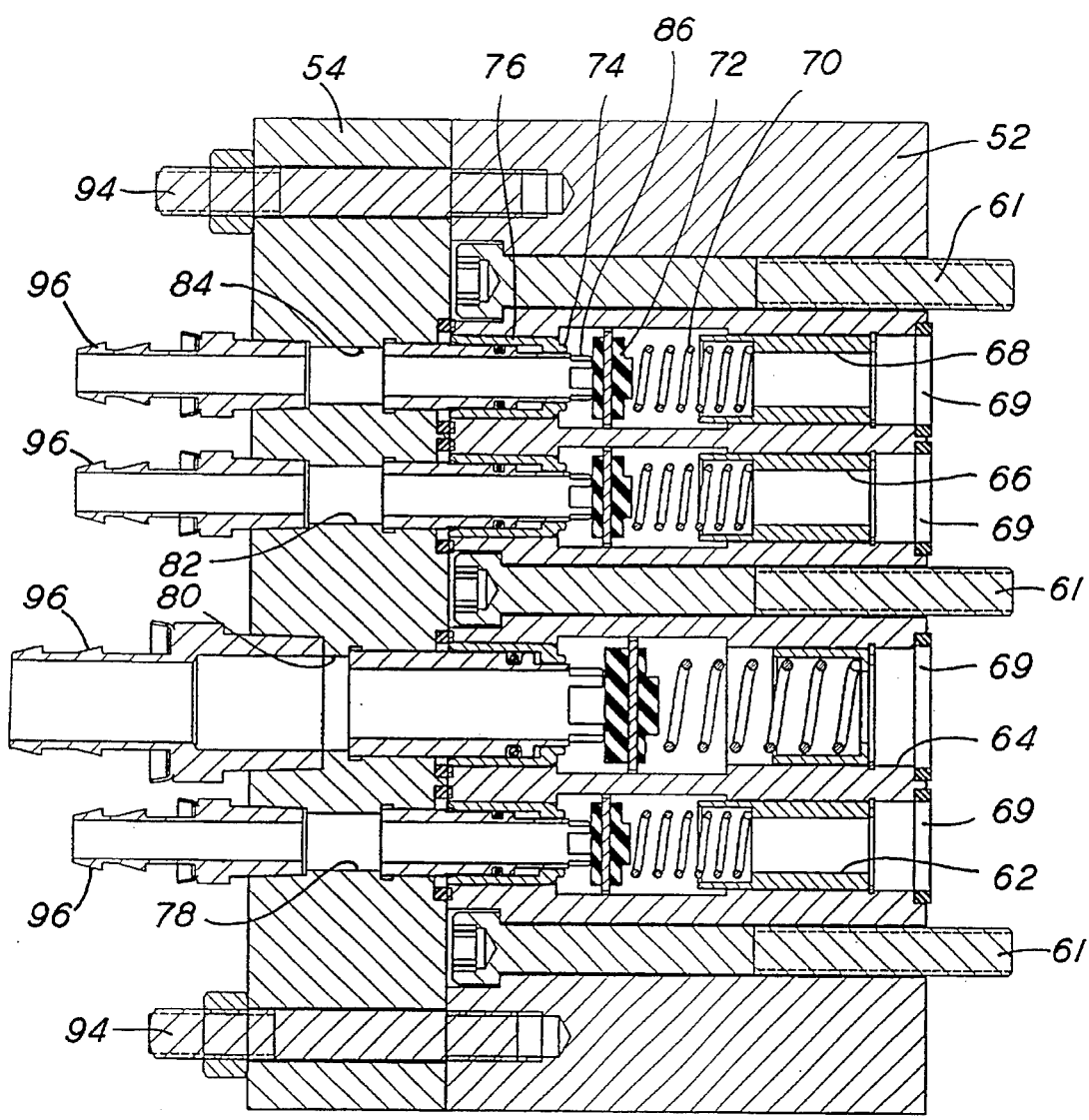
FIG. 7 is a cross sectional view of the housing and adaptor taken along line B—B of FIG. 6.

Referring next to FIGS. 6 and 7, an access housing 56 and adaptor 58 are shown attached to the pipe bracket portion 12. As can be seen, the access housing 56 is mounted upon the pipe bracket portion first side 14 at boss 54. The access housing 56 may be affixed to the pipe bracket portion first side 14 by any convenient means such as by housing screws 61. Preferably, the access housing 56 has a planar surface which mates with the planar surface of boss 54. It is further preferred that a gasket (not shown) be provided between the access housing 56 and the pipe bracket portion first side 14.

The access housing 56 has channels 62, 64, 66, 68 for communicating with the respective access ports 28, 30, 32, 34. The housing channels 62, 64, 66, 68 have opposed ends, with one end of each channel 62, 64, 66, 68 being bordered by an access end 69. Each access end 69 of the housing channels 62, 64, 66, 68 is sized and configured to connect to and sealably engage with the respective access ports 28, 30, 32, 34. The end of each of the housing channels opposite to each receiving end 69 have a receiving chamber 76. Furthermore, the housing channels 62, 64, 66, 68 are positioned in the access housing 56 such that when the access housing 56 is placed in contact with boss 54, the access ends 69 of the housing channels 62, 64, 66, 68 correspond in location to the respective access ports, 28, 30, 32, 34 of the pipe bracket portion first side 14.

Intermediate the receiving chamber 76 and the access end 69 of each housing channel 62, 64, 66, 68, preferably at a shoulder end of the receiving chamber 76, is a valve seat 74. Access housing 56 preferably has valve means provided therein. Preferably, a number of valve means are provided within the access housing 56, such that a respective valve means is provided within each of the housing channels 62, 64, 66, 68. Each such valve means is preferably comprised of a spring 70 seated within the housing channel, and a stopper 72 engageable with the spring 70 which together operate in connection with the valve seat 74. The stoppers 72 are each movable within their respective housing channels 62, 64, 66, 68 and are biased by the springs 70 into contact with the valve seats 74. With stoppers 72 in biased contact with the respective valve seats 74, the valve means is said to be in the closed position, in which fluid from the access ports 28, 30, 32, 34 cannot pass through valve seats 74 into the receiving chambers 76 of each housing channel 62, 64, 66, 68. Thus, when the valve means is in the closed position, no fluid pressure is lost through the access housing 56.

As can also be seen in FIGS. 6 and 7, an adaptor 58 may be attached to access housing 56 when it is desired to access the fluid pressures of the various pipe bracket passageways 40, 42, 44, 46. The adaptor 58 and the access housing 56 may be connected by any convenient means such as by screws 94. Adaptor 58 has channels 78, 80, 82, 84 provided therethrough. The adaptor channels are each bounded at one end by a respective extending member 86, which extends outward from one end of the adaptor 58. An opposite end of the adaptor channels 78, 80, 82, 84, are each bounded by a respective fitting 96, which extends outward from the adaptor 58. Adaptor channels 78, 80, 82, 84 are positioned along adaptor 58 such that when the adaptor 58 is placed adjacent the access housing 56, each adaptor channel 78, 80, 82, 84 corresponds in position and location with each respective housing channel 62, 64, 66, 68. Each of the adaptor extending members 86 are sized and configured to fit inside and sealably engage with each respective receiving chamber 76 of the access housing channels 62, 64, 66, 68.

When each adaptor extending member 86 is inserted within its respective receiving chamber 76 of the access housing channels 62, 64, 66, 68, each extending member 86 contacts a respective valve means stopper 72. As the extending members 86 are inserted fully within each receiving chamber 76, the extending members 86 push each valve means stopper 72, overcoming the spring bias against stopper 72 and moving the stopper 72 back away from its respective valve seat 74 into an "open" position. The extending members 86 are sized and configured so that when they are inserted within the receiving chambers 76, fluid may travel around the extending members 86 and into the respective housing channels 62, 64, 66, 68. When the valve means stopper 72 is in the open position, fluid pressure may travel from the pipe bracket passageways 40, 42, 44, 46, through the respective access ports 28, 30, 32, 34, through the respective housing channels 62, 64, 66, 68 and the respective adaptor channels 78, 80, 82, 84 and out of the adaptor fittings 96 where the fluid pressures may be analyzed.

When the adaptor 58 is separated from the access housing 56 such that each extending member 86 of the adaptor 58 is removed from its corresponding receiving chamber 76 of the access housing 56, the springs 70 will force the stoppers 72 against their respective valve seats 74 and the valve means will return to the closed position. Thus, when the adaptor 58 is removed from engagement with the access housing 56, fluid pressure is maintained within the access housing 56.

As an alternative, the valve means may be provided within the pipe bracket portion. In this embodiment, the housing is not necessary and the adaptor may be engaged directly with the access ports.

Figure 8:
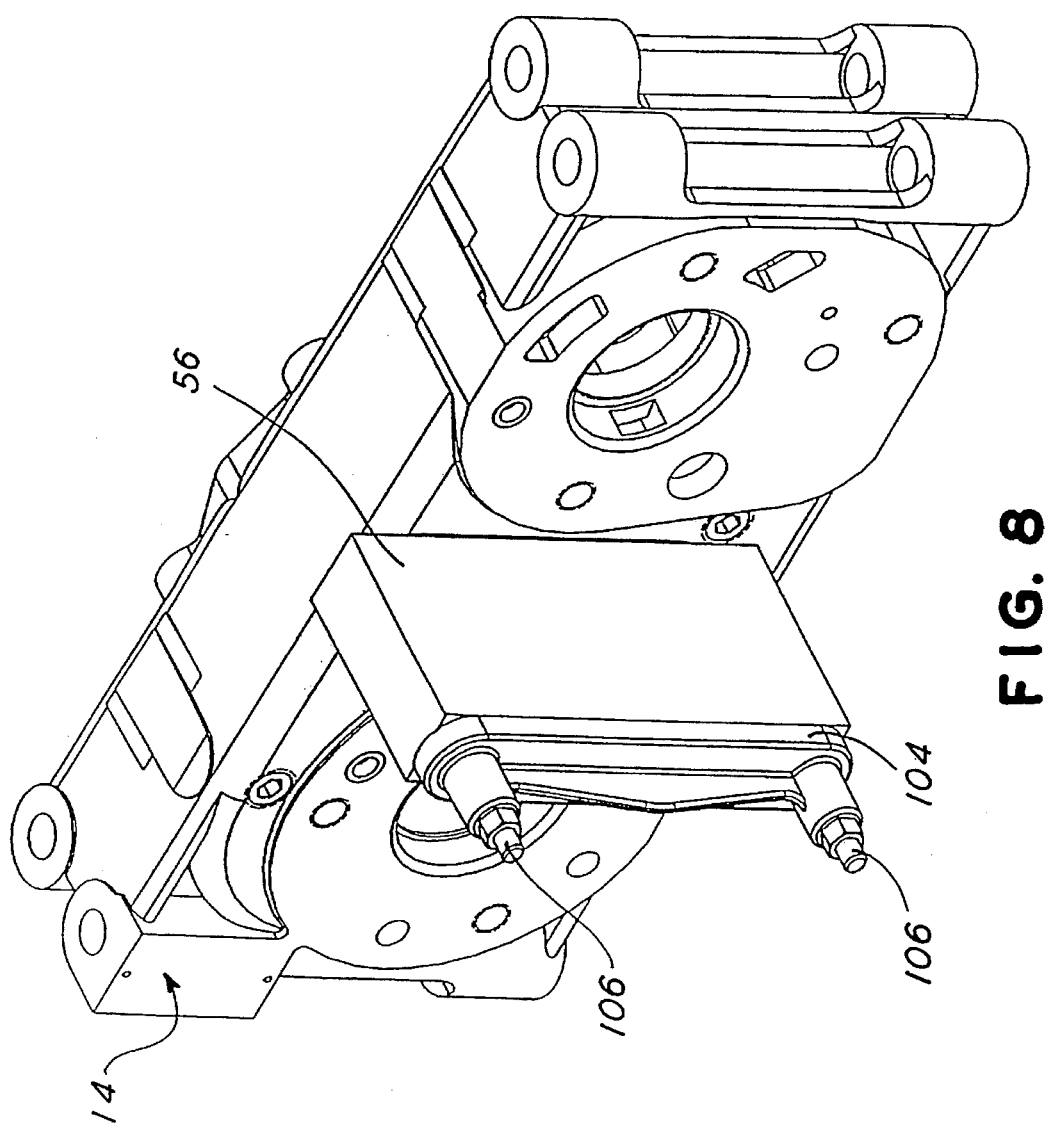
FIG. 8 is a perspective view of the pipe bracket portion similar to FIG. 6 with the adaptor detached from the housing and an outer cover attached to the housing.

To provide further sealing of the fluid pressure within the access housing 56 and to prevent the pipe bracket passageways 40, 42, 44, 46 from being contaminated by foreign material through the access ports 28, 30, 32, 34, a removable outer cover 104 may be provided for engagement with the access housing 56 as seen in FIG. 8. The cover 104 may be secured to the access housing 56 by any convenient means, such as by closure screws 106 which extend through the cover 104 and threadably engage with the access housing 56. The cover 104 is sized, configured and positioned to correspond and engage the receiving chamber openings 76 of the access housing 56.

Figure 9:
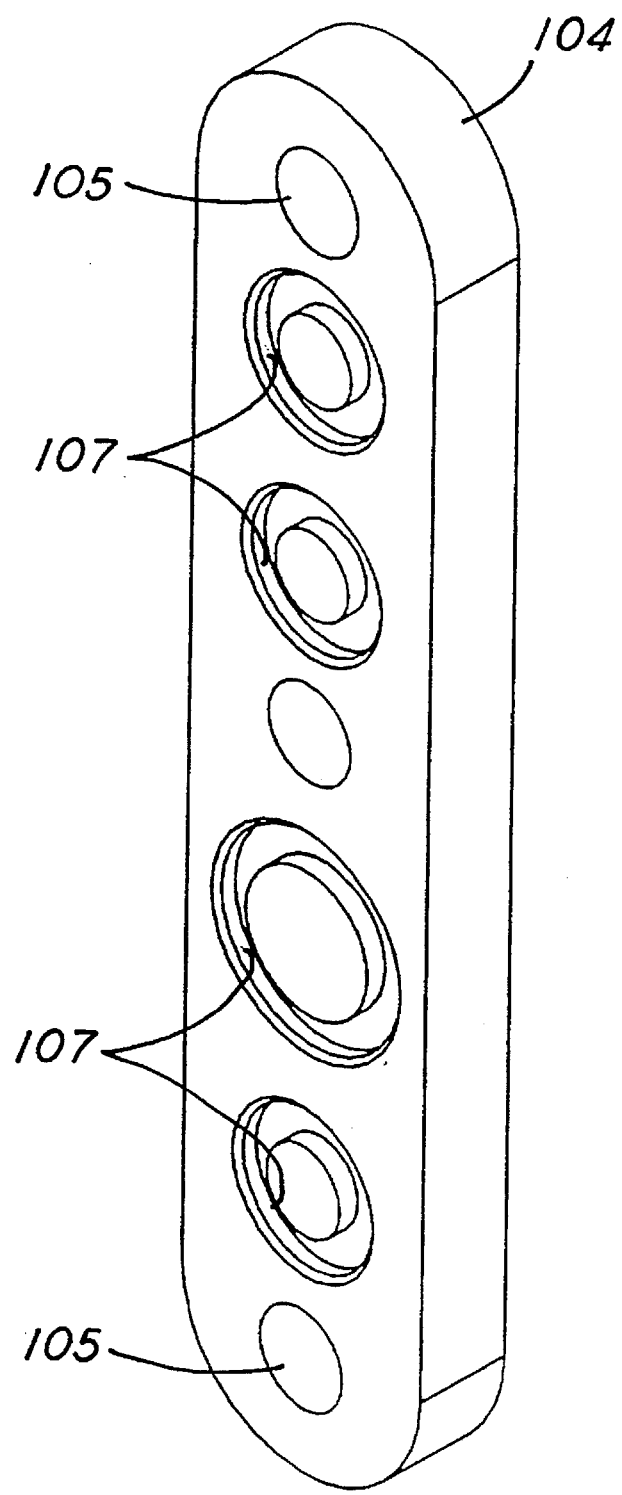
FIG. 9 is a perspective view of a first side of the primary seal cover.

Referring next to FIG. 9, a removable primary cover seal 110 may be secured directly to the pipe bracket portion 12 once the access housing 56 has been detached. The cover seal 110 is attached to the pipe bracket portion 12 by any convenient means, such as by studs or screws which extend through screw holes 114 of the cover seal 110 and threadably engage with the pipe bracket portion 12. Preferably, indentations 112 are provided upon a face of the cover seal 110. Indentations 112 are sized and positioned to correspond and sealingly engage the access ports 28, 30, 32, 34.

Figure 11:
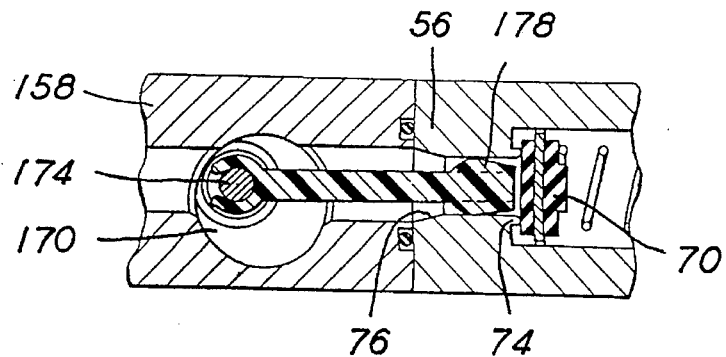
FIG. 11 is a cross sectional view taken along line C—C of FIG. 10.
Figure 10:
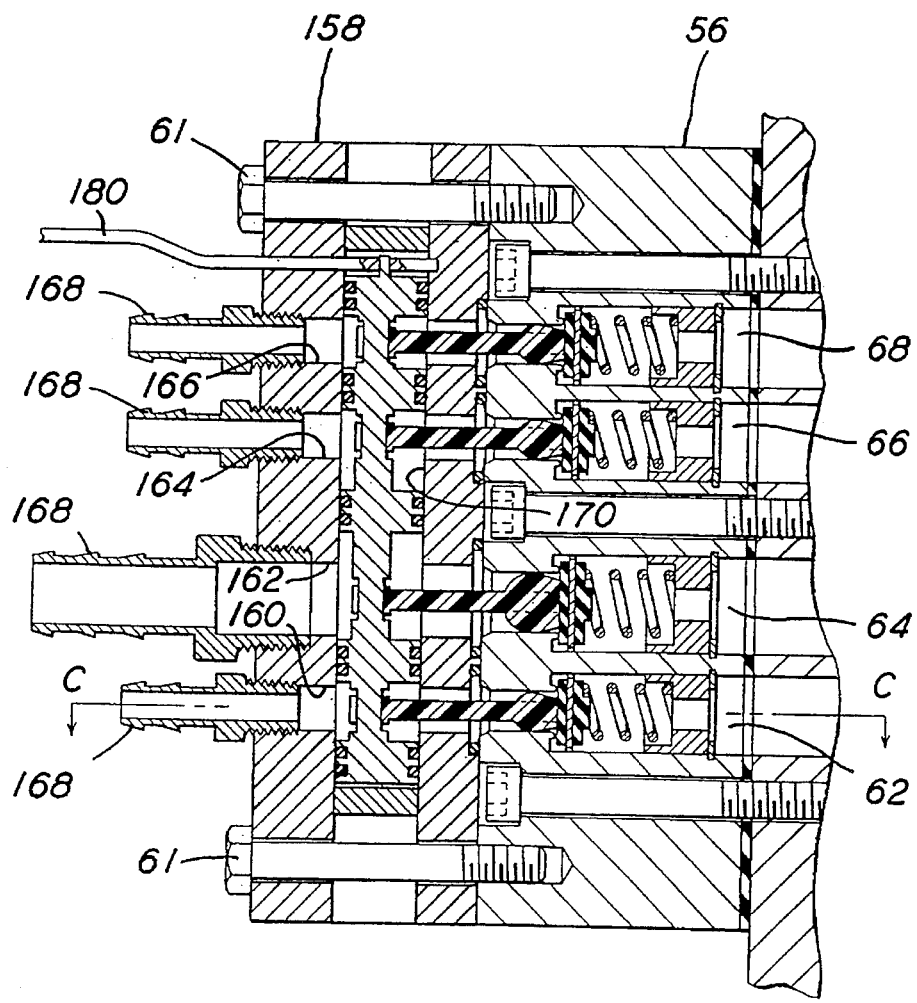
FIG. 10 is a side view taken in cross section of the housing and a second preferred adaptor.

Referring next to FIGS. 10 and 11, a modified adaptor 158 may be attached to access housing 56 as a means of accessing the fluid pressures of the various pipe bracket passageways 40, 42, 44, 46. With respect to the following description of adaptor 158, the access housing 56 operates in identical fashion as was described with respect to FIG. 7.

The adaptor 158 is affixed to the access housing 56 by any convenient means such as by studs 61. Adaptor 158 has channels 160, 162, 164, 166 provided therethrough. The adaptor channels 160, 162, 164, 166 are each bounded at one end by a respective fitting 168, which extends outward from the adaptor 158. An opposite end of each adaptor channel 160, 162, 164, 166 is connected to a transverse cam shaft bore 170. Provided within the cam shaft bore 170 is a cam shaft 172 having a number of eccentric portions 174. Each eccentric portion 174 is coupled to a respective extending member 178. The respective extending members 178 each extend outward from an end of the respective adaptor channel opposite to the end bounded by the fitting 168. The adaptor channels 160, 162, 164, 166 are positioned along adaptor 158 such that when the adaptor 158 is placed adjacent the access housing 56, each adaptor channel 160, 162, 164, 166 corresponds in position and location with each respective housing channel 62, 64, 66, 68. Each of the adaptor extending members 178 are sized and configured to fit inside and sealably engage with each respective receiving chamber 76 of the access housing channels 62, 64, 66, 68. When adaptor 158 is so positioned adjacent the access housing 56 and is affixed thereto such as by studs 61, the extending members 178 of adaptor 158 extend within receiving chambers 76 but do not contact valve means stopper 72 or, in the alternative, do not sufficiently contact valve means stopper 72 to move valve means stopper 72 overcoming the spring bias provided by spring 70 (not shown in FIGS. 10 and 11).

Once the adaptor 158 is secured to access housing 56 so that there is a seal between each respective adaptor channel 160, 162, 164, 166 and its respective access housing channel 62, 64, 66, 68, the cam shaft 172 is engaged. A cam handle 180 is provided which is connected to cam shaft 172. Thus, when handle 180 is rotated, cam shaft 172 is rotated as well within cam shaft bore 170. As cam shaft 172 is rotated, cam shaft eccentric portions 174 are moved in a circular path. As the handle 180 is rotated forward, the cam shaft eccentric portions 174 are rotated towards the access housing 56 causing extending members 178 to be moved further into the access housing 56. When the handle 180 is moved sufficiently, the extending members 178 are inserted fully within each receiving chamber 76, and the extending members 178 push each valve means stopper 72, overcoming the spring biased against stopper 72 and moving the stopper 72 back away from its respective valve seat 74 into an "open" position. The handle 180 is then locked into an open position while testing of the fluid pressures is conducted.

Once it is desired to disconnect the adaptor 158 from the access housing 56, the handle 180 is moved away from the access housing 56 moving the extending members 178 away from and out of each respective receiving chamber 76 so that the valve means stopper 72 is once again biased by the springs against their respective valve seats 74 causing the valve means to return to its "closed" position.

Variations of the shown embodiments are also possible. For example, the four access ports 28, 30, 32, 34 are preferably connected to the brake cylinder passageway 40, the brake pipe passageway 42, the auxiliary reservoir passageway 44 and the emergency reservoir passageway 46, respectively. However, a quick action chamber (not shown) is also provided in the pipe bracket portion 12 and an additional access port can be provided within housing 38 for communicating to the quick action chamber.

While certain present preferred embodiments have been shown and described, it is distinctly understood that the invention is not limited thereto but may be otherwise embodied within the scope of the following claims.

I claim:

1. A pipe bracket portion for use in a freight brake control valve of a railway freight vehicle, wherein such control valve is of the type using a brake pipe, a brake cylinder, an emergency reservoir and an auxiliary reservoir, said control valve further is of the type having a service portion and an emergency portion, such pipe bracket portion comprising:

a first side of said pipe bracket portion having means for mounting such service portion and means for mounting such emergency portion;

a second side of said pipe bracket portion opposite to said first side, said second side having means for connecting to such brake pipe, such brake cylinder, such emergency reservoir and such auxiliary reservoir;

a plurality of passageways provided through said pipe bracket portion for providing fluid communication from such brake pipe, such brake cylinder, such emergency reservoir, and such auxiliary reservoir to said service portion and said emergency portion; and at least one access port connected to at least one of said passageways communicating to such brake pipe, such brake cylinder, such emergency reservoir and such auxiliary reservoir.

2. The pipe bracket portion of claim 1 wherein said at least one access port is provided on said first side of said pipe bracket portion.

3. The pipe bracket portion of claim 2 wherein said at least one access port includes at least four ports communicating with each of such brake pipe, such brake cylinder, such emergency reservoir and such auxiliary reservoir.

4. The pipe bracket portion of claim 3 further comprising a quick action chamber access port communicating to said quick action chamber.

5. The pipe bracket portion of claim 3 further comprising a housing having at least four channels extending therethrough, each such housing channel being bounded at one end by a housing channel access and each such channel being bounded at an opposite end by a receiving chamber, wherein said channel access ends being sized and configured to sealably engage with respective ones of said access ports.

6. The pipe bracket portion of claim 5, wherein said housing further includes at least one valve means movable to a closed position in which fluid pressures are contained within each said channel of said housing, and an open position in which fluid pressure may exit said housing channels.

7. The pipe bracket portion of claim 5 further comprising a removable outer cover sealable with said access ports.

8. The pipe bracket portion of claim 6 further comprising an adaptor having at least four channels extending therethrough, each such adaptor channel having one end connectable to fluid pressure analyzing means and having an opposite end engageable with a respective access housing channel.

9. The pipe bracket portion of claim 8 wherein the end of each such adaptor channel that is engageable with a respective access housing channel is bounded at one end by a respective extending member wherein each such extending member enters a respective access housing receiving chamber, moving said valve means to said open position.

10. The pipe bracket portion of claim 1 wherein said at least one access port communicates with each of said brake pipe, said brake cylinder, said emergency reservoir and said auxiliary reservoir.

11. The pipe bracket portion of claim 1 wherein said at least one access port further includes a quick action chamber access port communicating with said quick action chamber.

12. The pipe bracket portion of claim 1 further including at least one valve means for containing a pressure within said respective port.

13. The pipe bracket portion of claim 11 further comprising a removable outer cover that seals said at least one valve means.

14. The pipe bracket portion of claim 1 further comprising a removable outer cover sealable with said at least one access port.

15. The pipe bracket portion of claim 1 further comprising a housing wherein at least one valve means is provided and said housing is connected to said first side of said pipe bracket portion.

16. The pipe bracket portion of claim 1 wherein said service portion and said emergency portion are mounted spaced apart on said first side and said at least one access port is intermediate said service portion and said emergency portion.

* * * * *

(12) REEXAMINATION CERTIFICATE (4328th)
United States Patent
Hart et al.

(10) Number: US 5,480,218 C1
(45) Certificate Issued: May 1, 2001

(54) RAILWAY BRAKE PIPE BRACKET WITH ACCESS PORTS

(75) Inventors: James E. Hart, Trafford; Gary M. Sich, Irwin, both of PA (US)

(73) Assignee: Westinghouse Air Brake Company, Wilmerding, PA (US)

Reexamination Request:
No. 90/005,353, May 10, 1999

Reexamination Certificate for:
Patent No.: 5,480,218
Issued: Jan. 2, 1996
Appl. No.: 08/306,790
Filed: Sep. 15, 1994

(51) Int. Cl.$^7$ ................................................ F16L 39/00
(52) U.S. Cl. ........................... 303/28; 137/594; 285/127.2
(58) Field of Search ................................ 303/28–35, 26, 303/27, 86, 2, 3, 15, 5, 9, 13; 285/137.11; 138/109; 137/594; 251/149.1

(56) References Cited

PUBLICATIONS

Booklet 5062–19, entitled "AB Single Capacity Freight Car Air Brake Equipment With ABDX Type Control Valves," published Aug., 1991, by Westinghouse Air Brake Company, Wilmerding, PA (previously cited).
Booklet 5062, entitled "The AB Freight Car Air Brake Equipment With The AB Control Valve," published Dec., 1975, by the Westinghouse Air Brake Division of American Standard, Wilmerding, PA.

A paper entitled "The Third Generation Brake Cylinder Release Valve," presented at the annual meeting of the Air Brake Association, Oct., 1963, by H. N. Sudduth, of the New York Brake Company of Watertown, New York, particularly the cover page and pp. 1 through 11.
Pp. 23, 27, 29, 30 and 31 of AAR Specification 2518, published by American Association of Railroads, Washington, D.C., date unknown but acknowledged to be prior art to the present application.

*Primary Examiner*—M. C. Graham

(57) ABSTRACT

A pipe bracket for use in a freight brake control valve on a railway freight vehicle. A service portion and an emergency portion are mounted to a first pipe bracket side directed opposite to the first pipe bracket side. Piping to a brake pipe, a brake cylinder, an emergency reservoir and an auxiliary reservoir are connected to a second side of the pipe bracket. A plurality of passageways are provided through the pipe bracket portion for providing fluid communication from the brake pipe, the brake cylinder, the emergency reservoir, and the auxiliary reservoir to the service portion and the emergency portion. One or more and preferably four access ports connect to one or more and preferably each of the passageways. Preferably, the access ports are provided on the first side of the pipe bracket portion. A housing having one or more channels, each corresponding to an access port is engaged to the pipe bracket portion so that fluid pressure at the access ports can be transmitted to the housing. The housing has a valve means for containing a pressure within the channels. A removable outer cover may be provided over the housing for sealing the channels. Or, an adaptor may engage the housing, opening the valve means, for accessing the fluid pressures.

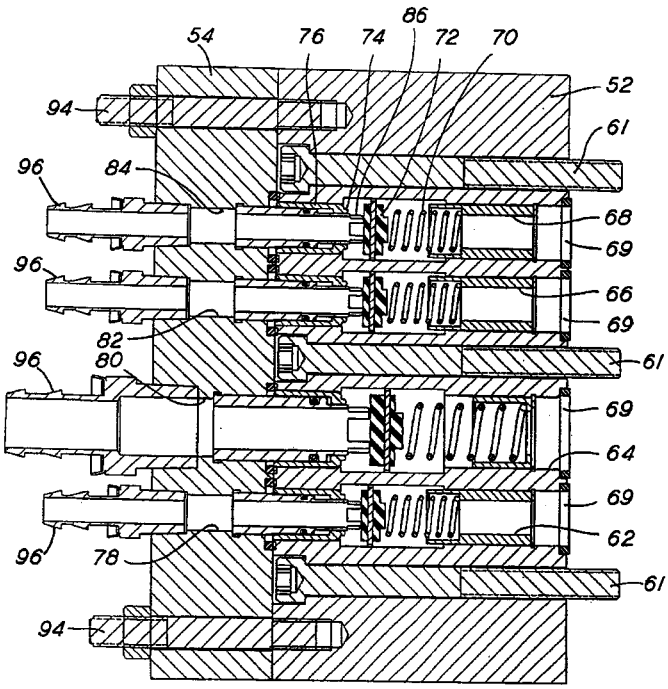

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 10 are cancelled.

Claims 1, 4–5, 8, 11, 13–14 and 16 are determined to be patentable as amended.

Claims 6, 7, 9, 12 and 15, dependent on an amended claim, are determined to be patentable.

1. A pipe bracket portion for use in a freight brake control valve of a railway freight vehicle, wherein such control valve is of the type using a brake pipe, a brake cylinder, an emergency reservoir and an auxiliary reservoir, said control valve further is of the type having a service portion and an emergency portion, such pipe bracket portion comprising:
   a first side of said pipe bracket portion having means for mounting such service portion and means for mounting such emergency portion;
   a second side of said pipe bracket portion opposite to said first side, said second side having means for connecting to such brake pipe, such brake cylinder, such emergency reservoir and such auxiliary reservoir;
   a plurality of passageways provided through said pipe bracket portion for providing fluid communication [from] *between respective ones of* such brake pipe, such brake cylinder, such emergency reservoir, and such auxiliary reservoir to said service portion and said emergency portion, [and]
   at least [one access port] *four access ports* connected to at least [one] *respective ones* of said passageways communicating to such brake pipe, such brake cylinder, such emergency reservoir and such auxiliary reservoir[.]; *and*
   *wherein said at least four access ports are provided on said first side of said pipe bracket portion.*

4. The pipe bracket portion of claim [3] *1* further comprising a quick action chamber access port communicating to said quick action chamber.

5. The pipe bracket portion of claim [3] *1* further comprising a housing having at least four channels extending therethrough, each such housing channel being bounded at one end by a housing channel access and each such channel being bounded at an opposite end by a receiving chamber, wherein said channel access ends being sized and configured to sealably engage with respective ones of said access ports.

8. [The pipe bracket portion of claim 6 further comprising] *A pipe bracket portion for use in a freight brake control valve of a railway freight vehicle, wherein such control valve is of the type using a brake pipe, a brake cylinder, an emergency reservoir and an auxiliary reservoir, said control valve further is of the type having a service portion and an emergency portion, such pipe bracket portion comprising:*
   *a first side of said pipe bracket portion having means for mounting such service portion and means for mounting such emergency portion;*
   *a second side of said pipe bracket portion opposite to said first side, said second side having means for connecting to such brake pipe, such brake cylinder, such emergency reservoir and such auxiliary reservoir;*
   *a plurality of passageways provided through said pipe bracket portion for providing fluid communication between respective ones of such brake pipe, such brake cylinder, such emergency reservoir, and such auxiliary reservoir to at least one of said service portion and said emergency portion;*
   *at least four access ports connected to at least respective ones of said passageways communicating to such brake pipe, such brake cylinder, such emergency reservoir and such auxiliary reservoir;*
   *said at least four access ports provided on said first of said pipe bracket portion;*
   *a housing having at least four channels extending therethrough, each such housing channel being bounded at one end by a housing channel access and each such channel being bounded at an opposite end by a receiving chamber, wherein said channel access ends being sized and configured to sealably engage with respective ones of said access ports;*
   *said housing further includes at least one valve means movable to a closed position in which fluid pressures are contained within each said channel of said housing, and an open position in which fluid pressure may exit said housing channels; and*
   *an adaptor having at least four channels extending therethrough, each such adaptor channel having one end connectable to fluuid pressure analyzing means and having an opposite end engageable with a respective access housing channel.*

11. The pipe bracket portion of claim 1 wherein said at least [one access port] *four access ports* further includes a quick action chamber access port communicating with said quick action chamber.

13. The pipe bracket portion of claim [11] *12* further comprising a removable outer cover that seals said at least one valve means.

14. The pipe bracket portion of claim 1 further comprising [a] *at least one* removable outer cover sealable with *at least one of* said at least [one access port] *four access ports*.

16. The pipe bracket portion of claim 1 wherein said service portion and said emergency portion are mounted spaced apart on said first side and said at least [one access port is] *four access ports are* intermediate said service portion and said emergency portion.

* * * * *